(12) United States Patent
Lin

(10) Patent No.: US 11,307,991 B2
(45) Date of Patent: *Apr. 19, 2022

(54) APPARATUS AND METHOD AND COMPUTER PROGRAM PRODUCT FOR GENERATING A STORAGE MAPPING TABLE

(71) Applicant: Silicon Motion, Inc., Zhubei (TW)

(72) Inventor: Jiyun-Wei Lin, Hsinchu County (TW)

(73) Assignee: SILICON MOTION, INC., Zhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/085,068

(22) Filed: Oct. 30, 2020

(65) Prior Publication Data
US 2021/0049105 A1    Feb. 18, 2021

Related U.S. Application Data

(63) Continuation of application No. 16/149,367, filed on Oct. 2, 2018, now Pat. No. 10,866,903.

(30) Foreign Application Priority Data

Jun. 25, 2018  (CN) .......................... 201810664292.7

(51) Int. Cl.
*G06F 12/10* (2016.01)
*G06F 13/28* (2006.01)

(52) U.S. Cl.
CPC ............. *G06F 12/10* (2013.01); *G06F 13/28* (2013.01); *G06F 2212/1044* (2013.01); *G06F 2212/7201* (2013.01); *G06F 2213/28* (2013.01)

(58) Field of Classification Search
None
See application file for complete search history.

(56) References Cited

U.S. PATENT DOCUMENTS

| | | | |
|---|---|---|---|
| 6,970,890 B1* | 11/2005 | Bruce | G06F 11/1435 |
| 7,343,469 B1* | 3/2008 | Bogin | G06F 12/1009 |
| | | | 711/202 |
| 7,590,795 B2 | 9/2009 | Sinclair et al. | |
| 9,304,907 B2 | 4/2016 | Yeh | |
| 9,747,229 B1* | 8/2017 | Hayes | G06F 3/0629 |
| 2006/0106972 A1* | 5/2006 | Gorobets | G06F 12/0246 |
| | | | 711/E12.008 |

(Continued)

FOREIGN PATENT DOCUMENTS

| CN | 104025010 A | 9/2014 |
|---|---|---|
| TW | 201502973 A | 1/2015 |
| TW | I587135 B | 6/2017 |

OTHER PUBLICATIONS

D. Takashima, M. Noguchi, N. Shibata, K. Kanda, H. Sukegawa and S. Fujii, "An Embedded DRAM Technology for High-Performance NAND Flash Memories," in IEEE Journal of Solid-State Circuits, vol. 47, No. 2, pp. 536-546, Feb. 2012, doi: 10.1109/JSSC.2011.2170779. (Year: 2012).*

(Continued)

*Primary Examiner* — Daniel C. Chappell
(74) *Attorney, Agent, or Firm* — Birch, Stewart, Kolasch & Birch, LLP

(57) ABSTRACT

The invention introduces an apparatus for generating a storage mapping table at least including a direct memory access controller for reading first physical location (PL) address corresponding to a logical location of the storage mapping table; an expanding circuit for obtaining the first PL address and expanding the first PL address into second PL address by appending data bits that originally provide different information from a physical address of the flash memory unit to the first PL address; and a controller for transmitting the second PL address without transmitting the first PL address stored in the flash memory unit to a host.

20 Claims, 13 Drawing Sheets

(56) References Cited

U.S. PATENT DOCUMENTS

| | | | | |
|---|---|---|---|---|
| 2008/0177938 | A1* | 7/2008 | Yu | G06F 12/0866 |
| | | | | 711/E12.019 |
| 2011/0219208 | A1* | 9/2011 | Asaad | G06F 9/06 |
| | | | | 712/12 |
| 2013/0086353 | A1* | 4/2013 | Colgrove | G06F 3/0688 |
| | | | | 711/E12.059 |
| 2014/0208004 | A1* | 7/2014 | Cohen | G06F 12/0246 |
| | | | | 711/103 |
| 2014/0281149 | A1* | 9/2014 | Roberts | G06F 13/1694 |
| | | | | 711/146 |
| 2017/0277530 | A1* | 9/2017 | Adams | G06F 8/654 |
| 2017/0364591 | A1* | 12/2017 | Lin | G06F 16/951 |
| 2018/0341547 | A1* | 11/2018 | Bolkhovitin | G11C 29/52 |
| 2019/0065788 | A1* | 2/2019 | Vijayasankar | H04L 63/0428 |
| 2019/0236004 | A1* | 8/2019 | Bernat | G06F 9/5016 |

OTHER PUBLICATIONS

D. Park and T. G. Kim, "Safe microcontrollers with error protection encoder-decoder using bit-inversion techniques for on-chip flash integrity verification," 2013 IEEE 2nd Global Conference on Consumer Electronics (GCCE), 2013, pp. 299-300, doi: 10.1109/GCCE.2013.6664833. (Year: 2013).*

J. Hu, C. J. Xue, W. -C. Tseng, Y. He, M. Qiu and E. H. . -M. Sha, "Reducing write activities on non-volatile memories in embedded CMPs via data migration and recomputation," Design Automation Conference, 2010, pp. 350-355. (Year: 2010).*

A. S. Ramasamy and P. Karantharaj, "RFFE: A Buffer Cache Management Algorithm for Flash-Memory-Based SSD to Improve Write Performance," in Canadian Journal of Electrical and Computer Engineering, vol. 38, No. 3, pp. 219-231, Summer 2015 (Year: 2015).

Seungjae Lee et al., "A 3.3 V 4 Gb four-level NAND flash memory with 90 nm CMOS technology," 2004 IEEE International Solid-State Circuits Conference (IEEE Cat. No. 04CH37519), San Francisco, CA, 2004, pp. 52-513 vol. 1 (Year: 2004).

Taiwanese Office Action and Search Report for Taiwanese Application No. 107121761, dated Jan. 18, 2019, with partial English translation.

* cited by examiner

APPARATUS AND METHOD AND COMPUTER PROGRAM PRODUCT FOR GENERATING A STORAGE MAPPING TABLE

CROSS-REFERENCE TO RELATED APPLICATIONS

This is a Continuing patent application of and claims the benefit of priority to U.S. patent application Ser. No. 16/149,367, filed on Oct. 2, 2018, which claims the benefit of priority to Patent Application No. 201810664292.7, filed in China on Jun. 25, 2018; the entirety of which is incorporated herein by reference for all purposes.

BACKGROUND

The disclosure generally relates to storage device and, more particularly, to apparatus and method and computer program product for generating a storage mapping table.

Flash memory devices typically include NOR flash devices and NAND flash devices. NOR flash devices are random access-a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. Actually, NAND flash devices usually read or program several pages of data from or into memory cells. In reality, the NAND flash device always reads from the memory cells and writes to the memory cells complete pages. After a page of data is read from the array into a buffer inside the device, the host can access the data bytes or words one by one by serially clocking them out using a strobe signal.

In order to improve the data write efficiency, data with continuous logical addresses may be distributed across different physical regions of a flash memory unit. The NAND flash device may store a storage mapping table to indicate which location in the flash memory unit data of each logical address is physically stored in. When receiving a data read command including a logical address issued by the host, the NAND flash device converts the received logical address into a physical address according to the content of the storage mapping table, read data from the physical address and replies to the host with the read data. However, data buffer space of the NAND flash device is usually not enough to store the whole storage mapping table, the NAND flash device is allowed to store only portion of that in a data buffer for fast look-up. When the logical address of the issued data read command cannot hit the partial storage mapping table of the data buffer, the NAND flash device consumes excessive time to read a relevant portion of that from the flash memory unit, resulting in an increased latency for obtaining data.

To decrease the latency, the new flash memory specification allows the host to issue a data read command including a physical address to the NAND flash device. But, the host requires to acquire the storage mapping table from the NAND flash device in advance to perform the logical-to-physical address conversion. However, the output format defined in the flash memory specification is typically different from the native format used in the NAND flash device and relevant conversions are required. Thus, it is desirable to have an apparatus, a method and a computer program product for reducing time in a generation of a storage mapping table conform to the specification.

SUMMARY

In an aspect of the invention, an apparatus for generating a storage mapping table of a flash memory device is introduced to at least include: a direct memory access (DMA) controller; an expanding circuit coupled to the DMA controller; and a controller coupled to the expanding circuit. The DMA controller is arranged to operably read first physical location (PL) address corresponding to a logical location of the storage mapping table. The expanding circuit is arranged operably to obtain the first PL address and expand the first PL address into second PL address by appending data bits that originally provide different information from a physical address of the flash memory unit to the first PL address. The controller is arranged to operably transmit the second PL address without transmitting the first PL address stored in the flash memory unit to a host.

In another aspect of the invention, a non-transitory computer program product for generating a storage mapping table of a flash memory device when executed by a processing unit, at least including program code to: receive a read request comprising a logical location for the storage mapping table; read first PL address corresponding to the logical location; store the first PL address in a data buffer; and output the first PL address to the expanding circuit, thereby enabling a controller to reply to the host with the second PL address other than the first PL address stored in the flash memory unit.

In still another aspect of the invention, a method for generating a storage mapping table of a flash memory device, performed a processing unit, at least including: receiving a read request comprising a logical location for the storage mapping table; reading first PL address corresponding to the logical location; storing the first PL address in a data buffer; and outputting the first PL address to the expanding circuit, thereby enabling a controller to reply to the host with the second PL address other than the first PL address stored in the flash memory unit.

The first and second PL address is represented in a first number and a second number of bytes, respectively, and the second number of bytes is greater than the first number of bytes.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
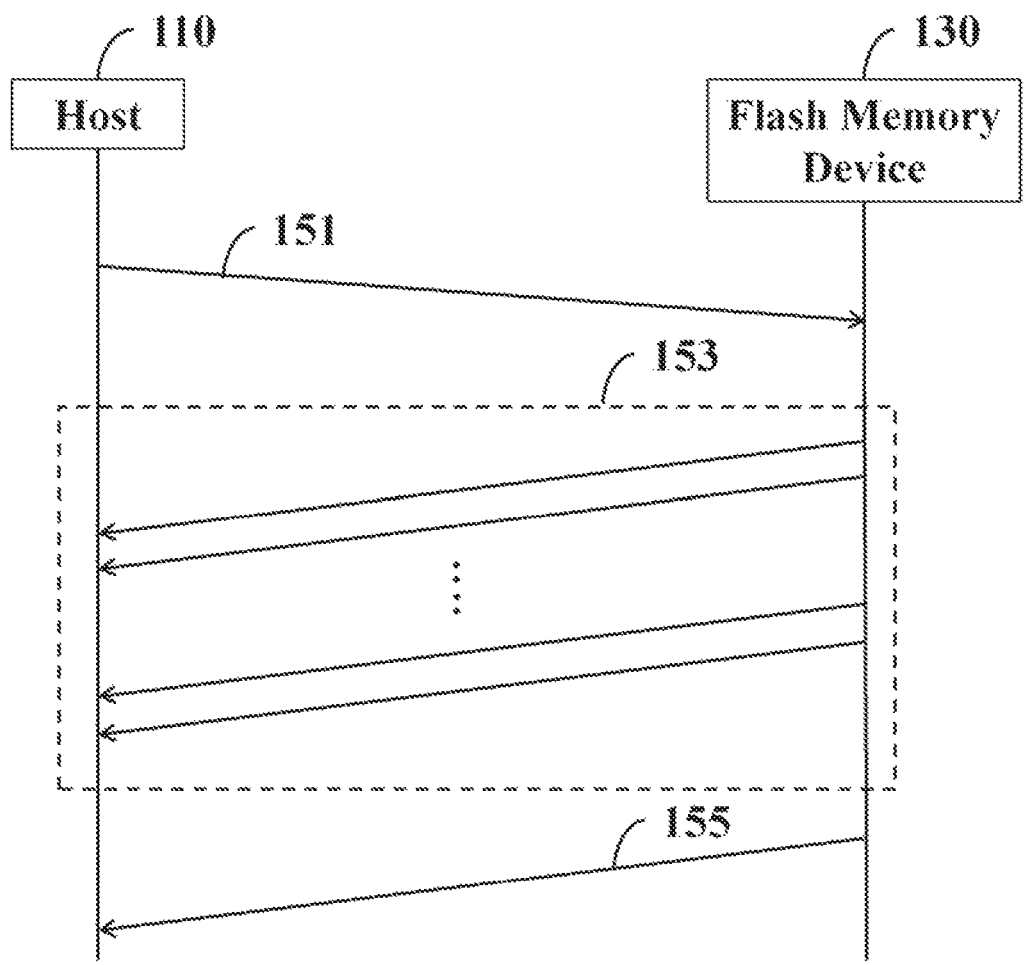
FIG. 1 is the sequence diagram depicting that a host requests a flash memory device for a storage mapping table according to an embodiment of the invention.

Refer to FIG. 1. A flash memory system includes a host 110 and a flash memory device 130 that communicate with each other in a flash memory protocol, such as Universal Flash Storage (UFS), etc. The flash memory device 130 may be a NAND flash memory device. Since the flash memory device 130 is not a random access device, to improve data write efficiency, the host 110 may provide continuous data longer than a predefined length, such as 128K bytes, such that the flash memory device 130 can program the data into several storage sub-units thereof in parallel. After user data of a logical address has been successfully programmed into a physical address of the storage sub-unit, the flash memory device 130 may update mapping information between the logical and physical addresses of a temporary storage mapping table temporarily stored in a Static Random Access Memory (SRAM). After the user data of a predefined number of logical addresses has been programmed successfully, a storage mapping table (also referred to as a Host-to-Flash H2F table) stored in a non-volatile flash memory unit is updated according to the content of the temporary storage mapping table. Thus, the content of the storage mapping table is maintained by the flash memory device 130 rather than the host 110. The storage mapping table records which location in the flash memory unit data of each logical address is physically stored in.

Figure 2:
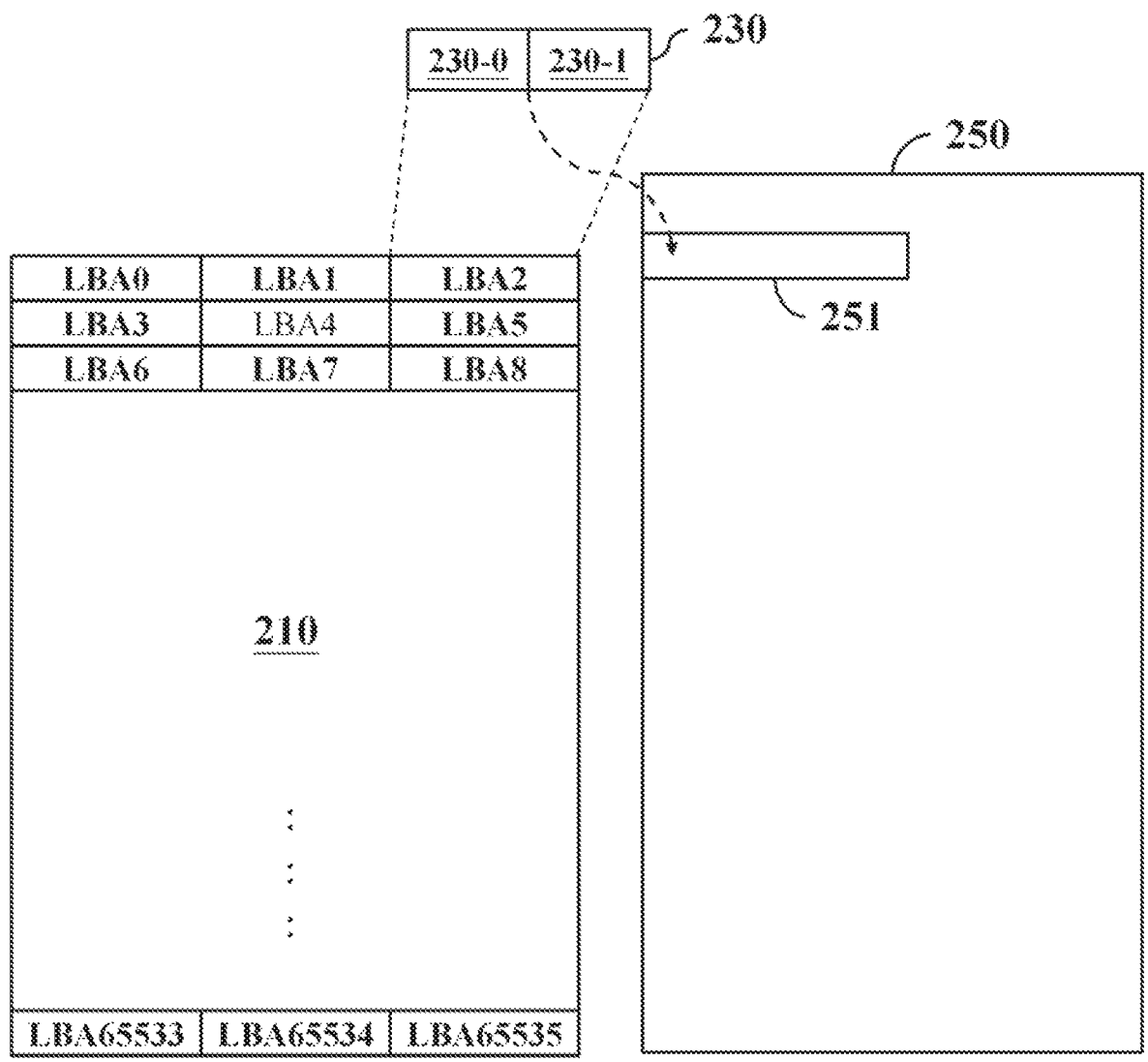
FIG. 2 is a schematic diagram illustrating a physical storage mapping according to an embodiment of the invention.

Refer to FIG. 2. The storage mapping table 210 may store physical-location (PL) address of the logical locations sequentially and occupy space ranging from 64M to 1G bytes. Each logical location may be represented by a Logical Block Address (LBA) and each LBA maps to a fixed length of physical storage space, such as 512 bytes. For example, a storage mapping table 210 sequentially stores PL information from LBA 0 to LBA 65535. Data of several continuous logical locations (such as LBA 0 to LBA 7) may form a host page. PL information 230 may be represented by four bytes: the former two bytes 230-0 record a physical-block number; and the later two bytes 230-1 record a unit number. For example, the PL information 230 corresponding to the logical location LBA 2 points to a physical region 251 of a physical block 250, by which the bytes 230-0 record a number of the physical block 250 and the bytes 230-1 record a unit number of the physical block 250.

The flash memory device 130 may update the content of the storage mapping table 210 in response to operations for, for example, performing data programming, a Garbage Collection (GC) process, a wear leveling process, a read reclaim process, a read reflash process, or others. When the content of the storage mapping table 210 has been updated, the flash memory device 130 may notify the host 110 that the storage mapping table 210 corresponding to the updated logical-location range needs to be reacquired (or renewed). After a reception of the notification, the host 110 may issue a read request 151 for the storage mapping table at an arbitrary moment. The read request 151 may include information of a logical-location range, such as LBA 0 to LBA 199. For example, the host 110 may issue a CMD UFS Protocol Information Unit (UPIU) including the read request 151 to the flash memory device 130. The flash memory device 130 may obtain the requested logical-location range of the storage mapping table 210 and execute a loop 153 for sending the requested logical-location range of the storage mapping table 210 in segments. In each iteration, the flash memory device 130 may encapsulate a portion of the requested logical-location range thereof into a data segment area of a DATA IN UPIU. After the requested PL information has been transmitted completely, the flash memory device 130 may send a read response 155 to the host 110. The flash memory device 130 may send a Response UPIU including the read response 155 to the host 110.

To prevent the storage mapping table 210 of a data buffer from being lost due to an unexceptional power loss, the flash memory device 130 preserves the whole storage mapping table 210 in a non-volatile flash memory unit thereof. For reducing the space consumption of the data buffer and the flash memory unit, the PL information corresponding to each logical location is typically recorded in as less bytes as possible. However, to make the host 110 to compatible with flash memory devices made by different manufacturers, the output format of the storage mapping table defined in the flash memory specification typically uses more bytes to record the PL information corresponding to each logical location. For example, the flash memory device 130 may use four bytes to store the PL information corresponding to each logical location but the flash memory specification defines to store the same information in eight bytes. Thus, the flash memory device 130 may expand the PL information 230 of the storage mapping table 210 into an output format in more bytes.

Figure 3:
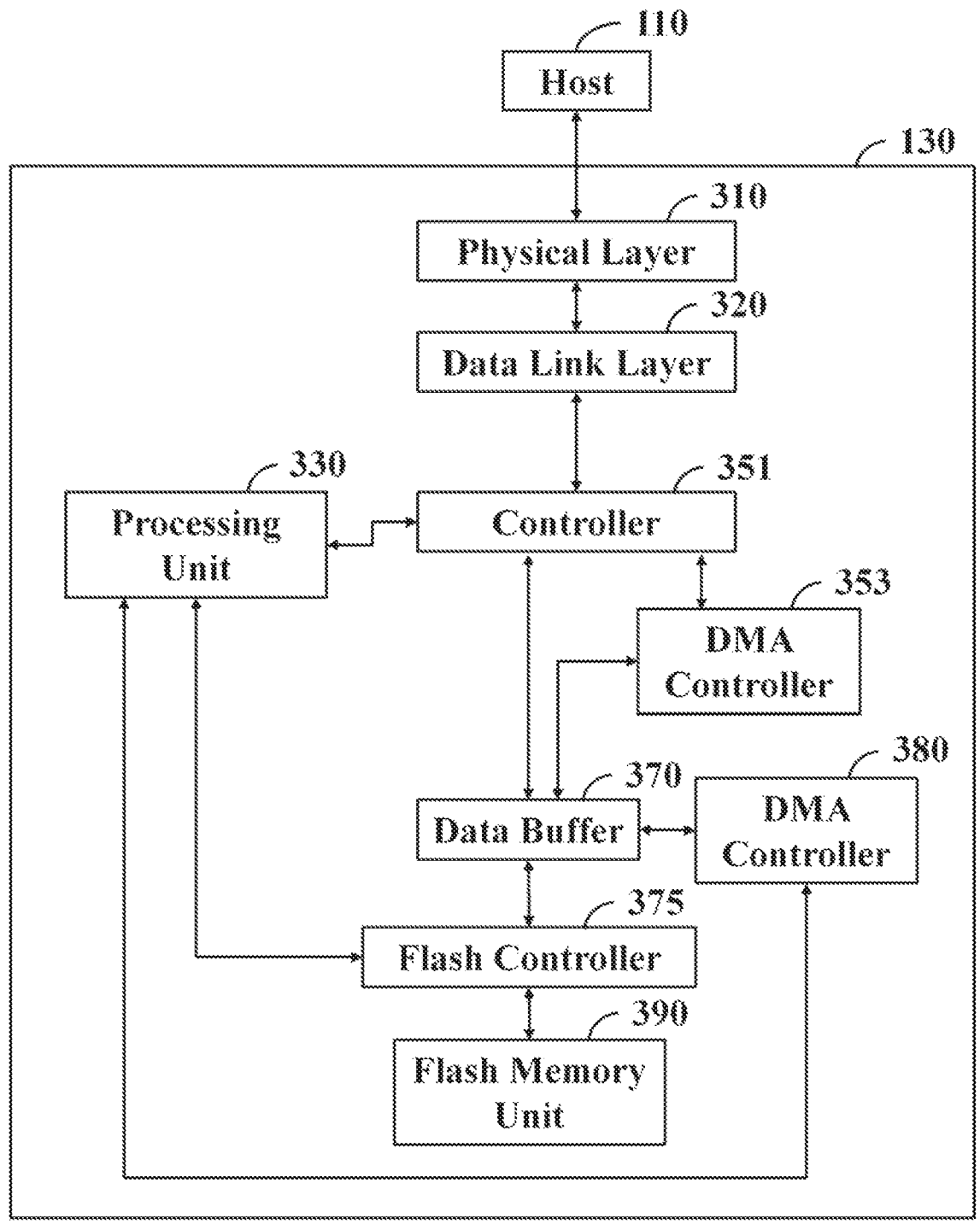
FIG. 3 is a system block diagram of some implementations.

In some implementations, the flash memory device 130 may allocate space of a data buffer for performing a format conversion. Refer to FIG. 3. Assume that the flash memory device 130 may use four bytes as shown in FIG. 2 to store the PL information corresponding to each logical location but the flash memory specification defines to store the same information in eight bytes: After receiving the read request 151 from the host 110, the processing unit 330 drives a flash memory unit 390 to read the requested logical-location range of the storage mapping table 210 and stores the read one in a data buffer 370. The data buffer 370 allocates two regions for storing raw storage mapping table 210 and an expanded storage mapping table, respectively. Next, the processing unit 330 drives a Direct Memory Access (DMA) controller 380 to duplicate the raw storage mapping table 210 to make two copies (as a whole referred to as an expanded storage mapping table), and stores the two copies in a designated region of the data buffer 370. Subsequently, the processing unit 330 drives a DMA controller 353 through a controller 351 to read the expanded storage mapping table from the designated region of the data buffer 370 and replies to the host 110 with the expanded storage mapping table through a data link layer 320 (for example, an unipro) and a physical layer 310. However, the implementations require to allocate a region of the data buffer 370 to store the expanded storage mapping table. For example, for 1 KB raw PL information corresponding to 256 logical locations, the data buffer 370 has to allocate extra 2 KB space to store expanded PL information. The data buffer 370 is a scarce resource and the additional region for storing the expanded storage mapping table may exclude a storage of other important data. Furthermore, the aforementioned implementations require the processing unit 330 to spend time for controlling the DMA controller 380.

Figure 4:
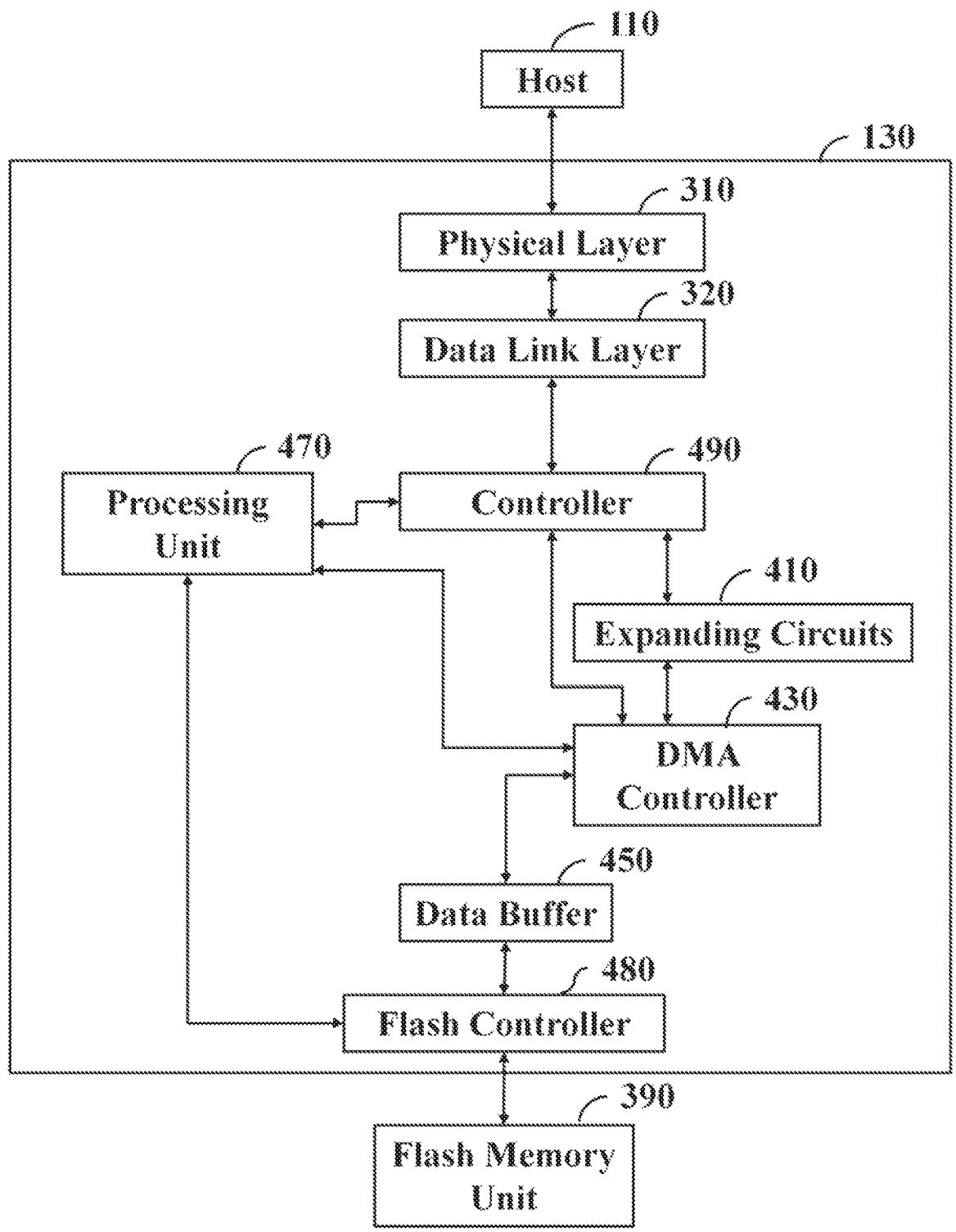
FIG. 4 is a block diagram illustrating a system for generating a physical storage mapping table used in a flash memory device according to an embodiment of the invention.

To address the drawbacks of the aforementioned implementations, an embodiment of a system as shown in FIG. 4 is disclosed. A controller 490 is electrically connected (coupled) to the host 110 through the data link layer 320 and the physical layer 310 and connected between a processing unit 470, an expanding circuit 410 and a DMA controller 430. The processing unit 470 connects a flash controller 480 for driving the flash controller 480 to read user data from a designated physical location of the flash memory unit 390 and stores the read data in the data buffer 450 according to a read command issued by the host 110. The processing unit 470 may obtain user data to be written from the data buffer 450 and drive the flash controller 480 for programming the user data into a designated physical location of the flash memory unit 390 according to a write command issued by the host 110. The processing unit 470 may drive the flash controller 480 for performing an erase operation on a designated physical location thereof according to an erase command issued by the host 110. The controller 490 may read the user data from the data buffer 450 through the DMA controller 430 and clock the user data out to the host 110 sequentially by driving the data link layer 320 and the physical layer 310. The controller may store to-be-written user data that is transmitted from the host 110 in the data buffer 450 through the DMA controller 430. The processing unit 470 may be implemented in a general-purpose hardware, such as a single processor, multi-processors with parallel computation capacity, Graphical Processing Unit (GPU), a lightweight general-purpose processor or others with calculation capacity, and perform the recited functions when loading and executing relevant instructions, macrocode, microcode or others. The controller 490 may be a UFS controller to communicate with the host 110 through the UFS communications protocol. Although the embodiments describe the UFS communications protocol as an example, the invention can be applied to other communications protocols that allows a host to issue a read command including PL information to a flash memory device, such as Universal Serial Bus (USB), Advanced Technology Attachment (ATA), Serial Advanced Technology Attachment (SATA), Peripheral Component Interconnect Express (PCI-E), etc., and their extensions.

The DMA controller 430 may read raw PL information corresponding to each logical location of the storage mapping table 210 from the data buffer 450 and the raw PL information is represented in a first number of bytes. The expanding circuit 410 is connected or coupled to the DMA controller 430 to obtain the raw PL information, expands the raw PL information into that represented in a second number of bytes and outputs the expanded PL information to the controller 490, where the second number is greater than the first number. The controller 490 is connected or coupled to the expanding circuit 410 and transmits (or replies with) the expanded PL information to the host 110 through the data link layer 320 and the physical layer 310.

The processing unit 470 is responsible for maintaining the content of the storage mapping table 210, rather than the host 110, and the storage mapping table 210 records which location of the flash memory unit 390 user data of each logical location is physically stored in.

Figure 5:
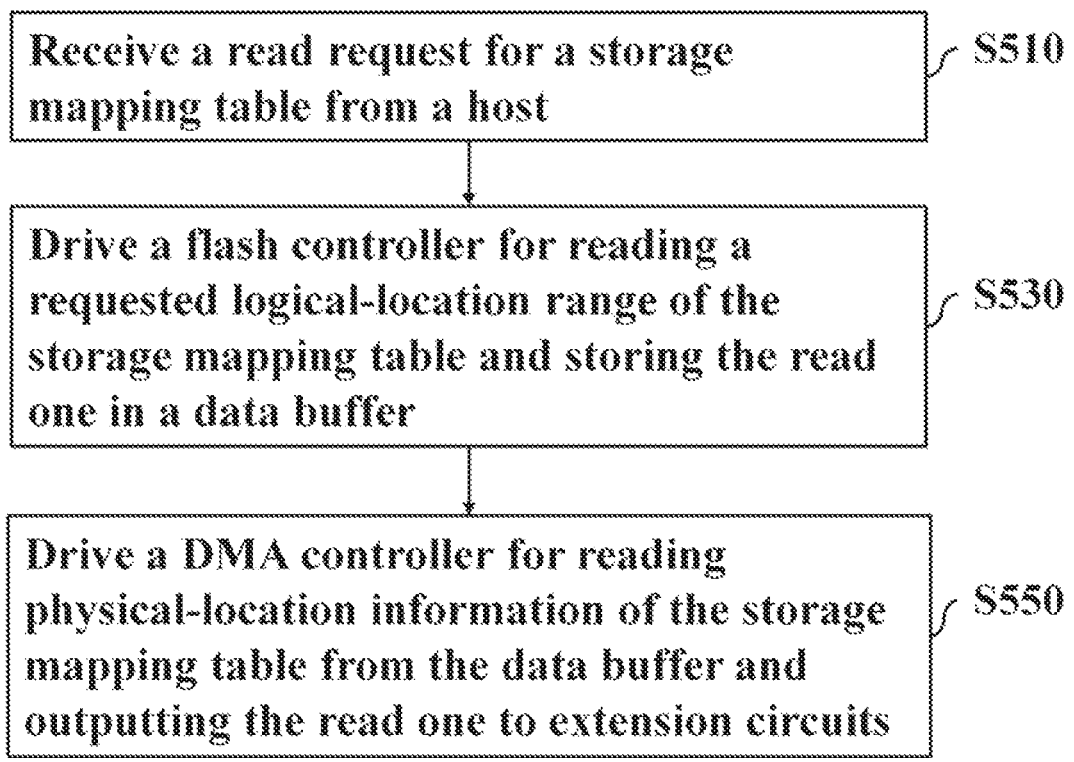
FIG. 5 is a flowchart illustrating a method for generating a physical storage mapping table used in a flash memory device according to an embodiment of the invention.

FIG. 5 illustrates an embodiment of a method that is performed when the processing unit 470 loads and executes instructions, macrocode or microcode. After receiving the read request 151 from the host 110 through the controller 490 (step S510), the processing unit 470 drives the flash controller 480 for reading a requested logical-location range of the storage mapping table 210 (that is, PL information within the requested logical-location range) and storing the read one in the data buffer 450 (step S530). It is understood that the data buffer 450 allocates space for storing the raw storage mapping table 210 only. Next, the processing unit 470 drives the DMA controller 430 for reading the PL information of the storage mapping table 210 from the data buffer 450 and outputting the read one to the expanding circuit 410 (step S550).

The flash memory controller 480 may use several electrical signals to coordinate data and command transmissions with the flash memory units 390, including data lines, clock signals and control signals. The data lines may be used to transfer commands, addresses, read data and data to be programmed. The control signals may carry Chip Enable (CE), Address Latch Enable (ALE), Command Latch Enable (CLE), Write Enable (WE) signals, etc. The processing unit 470 may communicate with the flash memory unit 390 using a Double Data Rate (DDR) protocol, such as Open NAND Flash Interface (ONFI), DDR toggle, or others.

Figure 6:
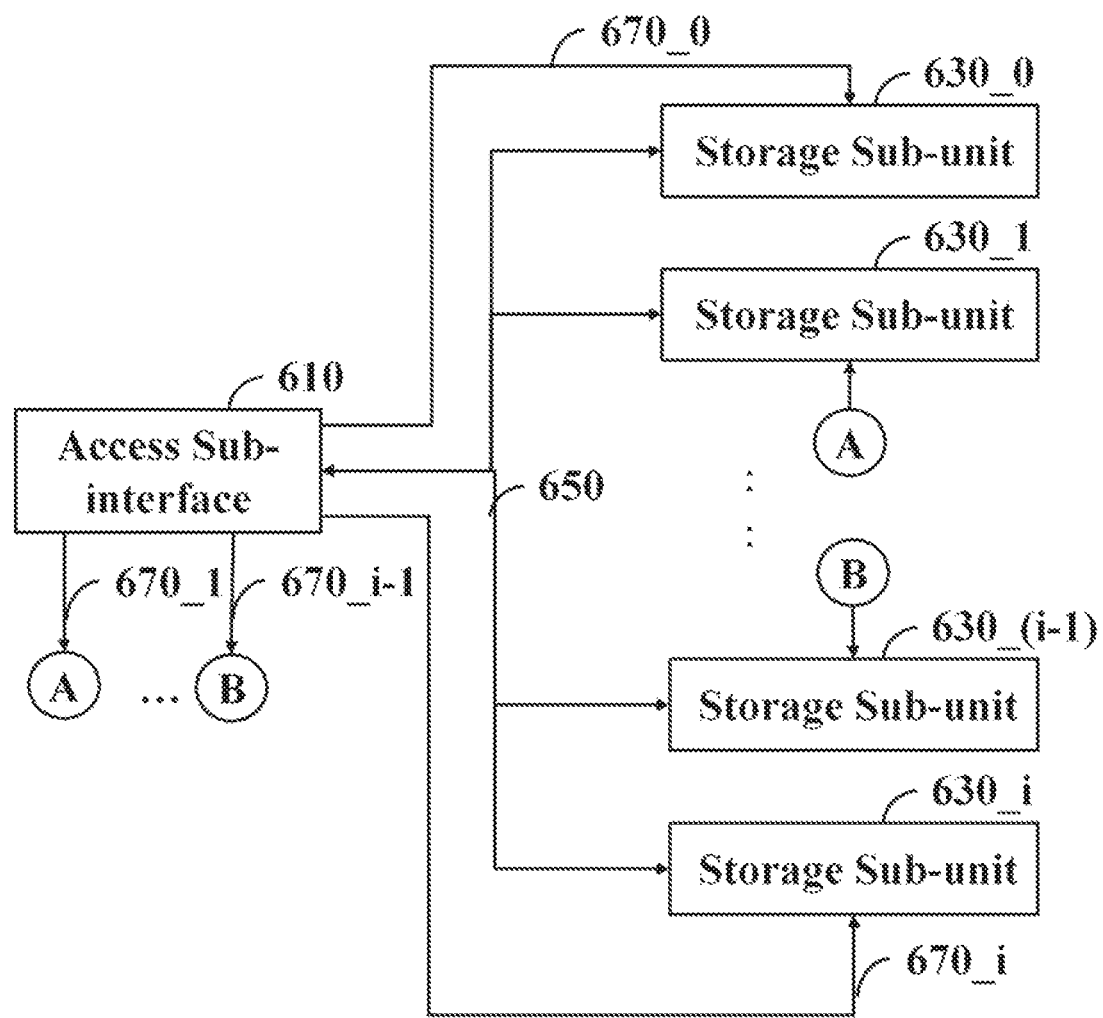
FIG. 6 is a schematic diagram depicting connections between one access sub-interface and multiple storage sub-units according to an embodiment of the invention.

The flash memory unit 390 may contain multiple storage sub-units and each storage sub-unit may use a respective access sub-interface to communicate with the processing unit 470. One or more storage sub-units may be packaged in a single die. Each access sub-interface and the storage sub-units connected behind may be collectively referred to as a Input-and-Output (I/O) channel, and identified by a Logical Unit Number (LUN). That is, multiple storage sub-units may share the same access sub-interface. For example, assume that the flash memory unit 390 contains four access sub-interfaces and each access sub-interface connects to four storage sub-units: The flash memory unit 390 has sixteen storage sub-units in total. The processing unit 470 may drive one of the access sub-interfaces to read data from the designated storage sub-unit. Each storage sub-unit has an independent CE control signal. That is, it is required to enable a corresponding CE control signal when attempting to perform data read or programming from or into a designated storage sub-unit via an associated access sub-interface. Refer to FIG. 6. The processing unit 470, through the access sub-interface 610, may use independent CE control signals 670_0 to 670_i to select one of the connected storage sub-units 630_0 to 630_i, and then read data from or program data into the designated location of the selected storage sub-unit via the shared data line 650.

Refer to FIG. 4. The expanding circuit 410 expands PL information of the storage mapping table 410 corresponding to each logical location of the read request 151 into a length of bytes defined in the flash memory specification. Next, the controller 490 may obtain the expanded PL corresponding to each logical location from the expanding circuit 410 and reply to the host 110 with the obtained ones through the data link layer 320 and the physical layer 310. The physical layer 310 may include a differential output pair (Tx pair) to transmit data or reply with a message to the host, and a differential input pair (Rx pair) to receive data or commands from the host 110. In alternative embodiments, the expanding circuit 410 may be integrated into the DMA controller 430 as a part thereof.

As to FIGS. 7 to 13, they can be realized in that the flash memory device 130 uses more or less than four bytes to store PL information corresponding to each logical location and the flash memory specification uses more than eight bytes, or less than eight bytes but higher than the number of bytes that is used in the flash memory device 130 to store the PL information, and the invention should not be limited thereof.

Figure 7:
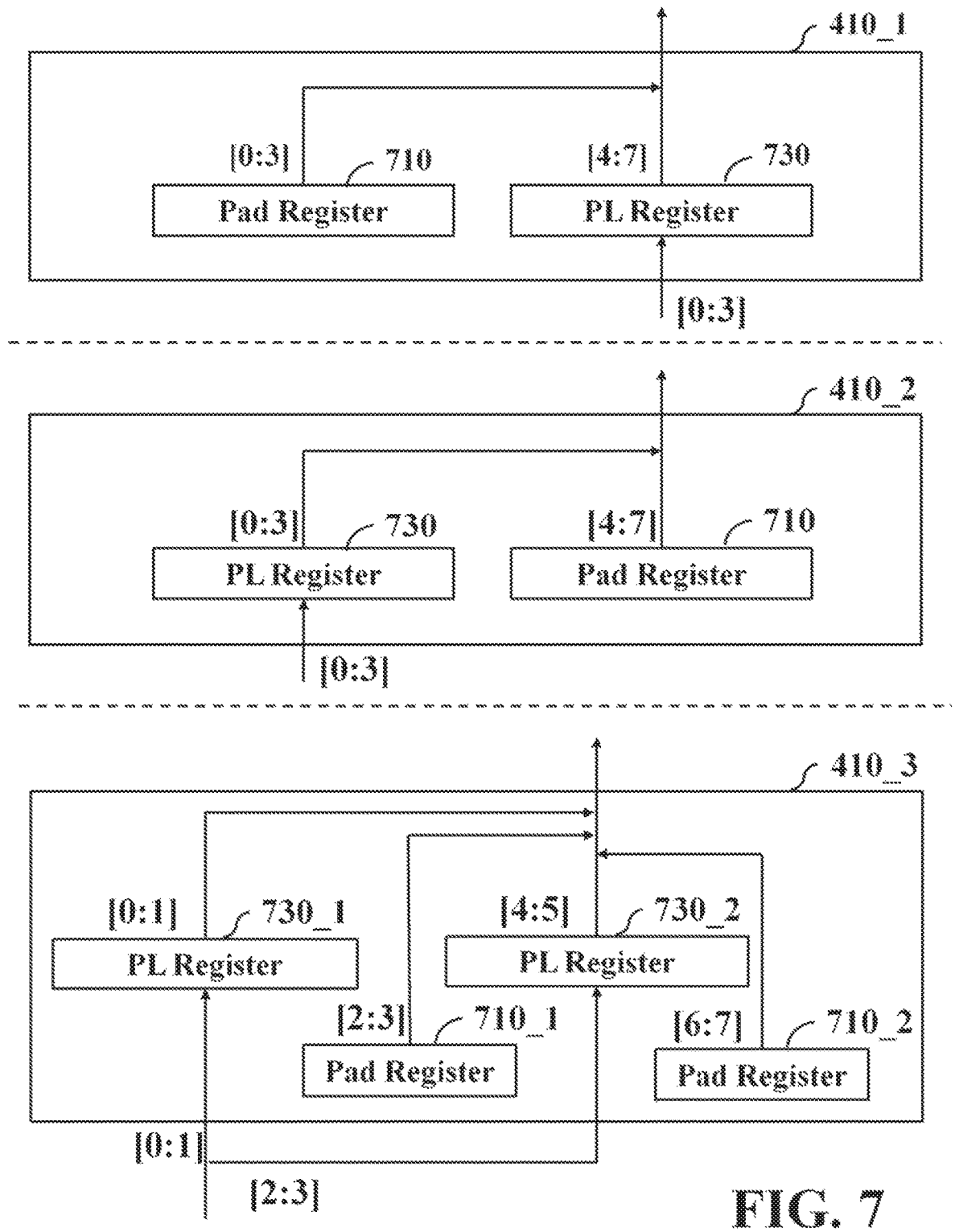
FIGS. 7 to 13 are block diagrams illustrating expanding circuits according to embodiments of the invention.

Refer to FIG. 7. The expanding circuit 410 may generate the expanded PL information by appending padding data. Specifically, the expanding circuit 410 may receive PL information from the data buffer 450 through the DMA controller 430, append padding data to the PL information to become expanded PL information and output that to the controller 490. The expanding circuits 410_1 to 410_3 may be referred to as padding-type expanding circuits.

The expanding circuit 410_1 may include a 4-byte pad register 710 and a 4-byte PL register 730. The pad register 710 latches a dummy value, such as 0x0000, 0xFFFF, 0xAAAA or another data pattern. The PL register 730 is electrically connected to an output of the DMA controller 430 for receiving and latching PL information [0:3] corresponding to a logical location. The controller 490 may obtain the dummy value of the pad register 710 as expanded PL (exp-PL) information [0:3] and the PL information of the PL register 730 as the exp-PL information [4:7] and output the assembly to the data link layer 320. The above process may be referred to as a pre-padding.

Similarly, the expanding circuit 410_2 may include a PL register 730a and 4-byte pad register 710. The controller 490 may obtain the PL information of the PL register 730 as exp-PL information [0:3] and the dummy value of the pad register 710 as the exp-PL information [4:7] and output the assembly to the data link layer 320. The above process may be referred to as post-padding.

The expanding circuit 410_3 uses an interleaved-padding to generate the expanded PL information. The expanding circuit 410_3 may include two 2-byte pad registers 710_1 and 710_2 and two 2-byte PL registers 730_1 and 730_2. The pad registers 710_1 and 710_2 may latch the same or different dummy values. The PL registers 730_1 and 730_2, for example, latch a physical-block number and a unit number, respectively. The controller 490 may read values of the PL register 730_1, the pad register 710_1, the PL register 730_2 and the pad register 710_2 as the exp-PL information [0:1], [2:3], [4:5] and [6:7] and output the assembly to the data link layer 320. Those artisans may modify the component configuration of the expanding circuit 410_3 to achieve a similar but different interleaved-padding, for example, employing four 1-byte pad registers and four 1-byte PL registers, rearranging the components of the expanding circuit 410_3, or others, and the invention should not be limited thereto.

Figure 8:
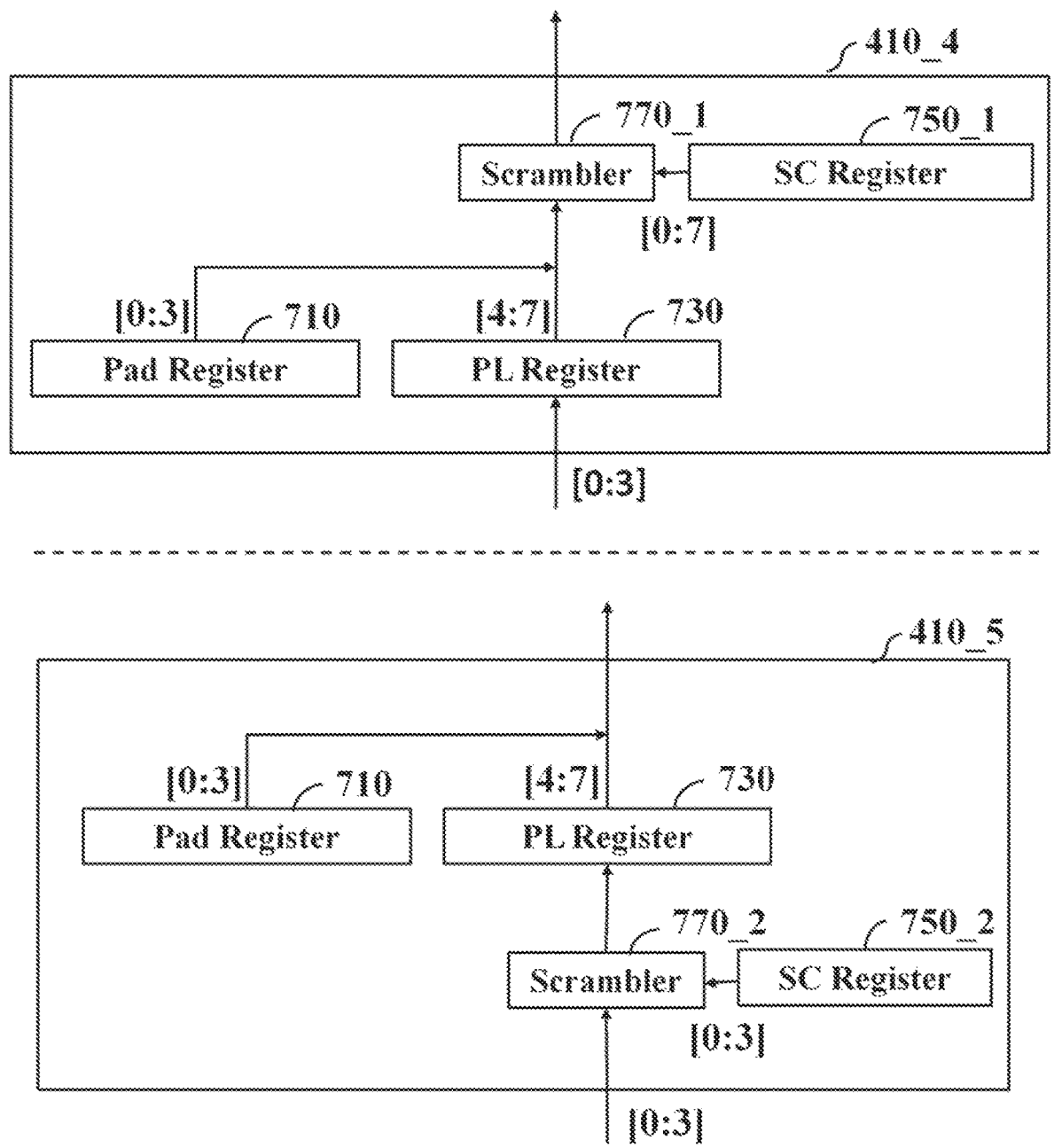

The padding-type expanding circuit 410_1 may be modified to add a scrambler for scrambling the PL information to avoid a malicious use. The scrambler may transpose or otherwise encode the PL information at the flash memory device 130 to make the encoded message unintelligible at the host 110 not equipped with an appropriately set descrambling device. FIG. 8 shows improved expanding circuits 410_4 and 410_5. The expanding circuit 410_4 may be further equipped with an eight-byte scrambling-code (SC) register 750_1 for latching a SC [0:7]. The expanding circuit 410_4 may be further equipped with a scrambler 770_1 connected to the outputs of the SC register 750_1, the pad register 710 and the PL register 730 and the input of the controller 490. The scrambler 770_1 may perform a scrambling algorithm for applying the value of the SC register 750_1 on the padded PL (pad-PL) information and output the scrambled pad-PL information to the controller 490. The scrambler 770_1 may include several XOR gates to perform logic XOR operations on the pad-PL information with the value of the SC register 750_1. The controller 490 subsequently replies to the host 110 with the scrambled pad-PL information as the exp-PL information.

The expanding circuit 410_5 may include a 4-byte SC register 750_2 for latching a SC [0:3]. The expanding circuit 410_5 may be further equipped with a scrambler 770_2 connected to inputs of a SC register 750_1 and the PL register 730 and an output of the DMI controller 430. The scrambler 7702 may perform a scrambling algorithm for applying the value of the SC register 750_2 on the raw PL information and output the scrambled PL (scr-PL) information to the PL register 730. The scrambler 770_2 may include several XOR gates to perform logic XOR operations on the raw PL information with the value of the SC register 750_2. The controller 490 may obtain the dummy value as the exp-PL information [0:3] and the scr-PL information of the PL register 730 as the exp-PL information [4:7] and output the assembly to the data link layer 320 for replying to the host 110.

The padding-type expanding circuit 410_2 as shown in FIG. 7 may be modified to dispose the scrambler 770_1 or 770_2 and the SC register 750_1 or 750_2 to encode the (expanded) PL information to avoid a malicious use. Those artisans may deduce the detailed modifications to the expanding circuit 410_2 with references made to the aforementioned modifications to the padding-type expanding circuit 410_1, being omitted for brevity.

Figure 9:
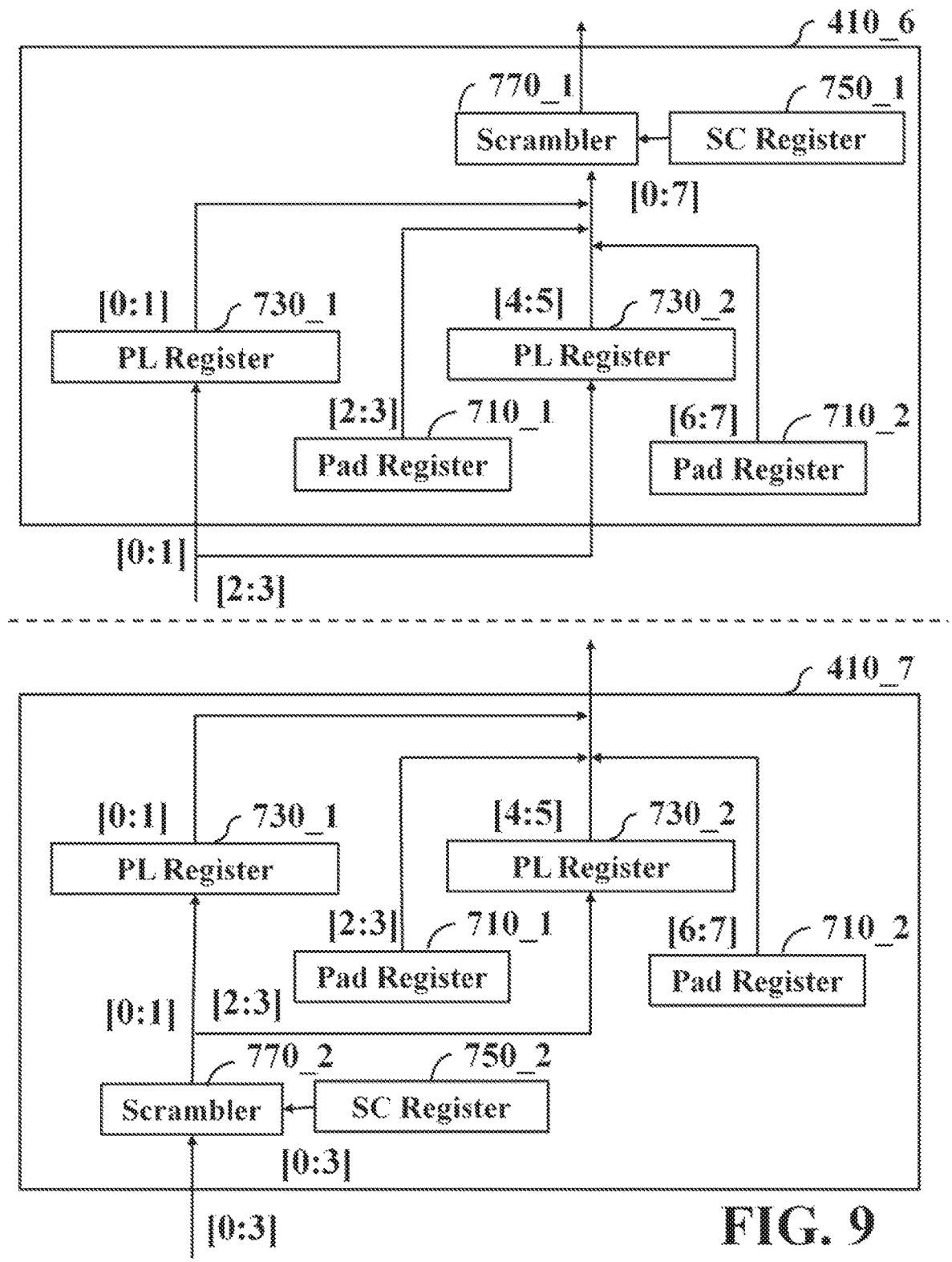

The padding-type expanding circuit 410_3 as shown in FIG. 7 may be modified to dispose a scrambler to encode the PL information to avoid a malicious use. FIG. 9 shows improved expanding circuits 410_6 and 410_7. The expanding circuit 4106 may be further equipped with the scrambler 770_1 connected to outputs of the SC register 750_1, the pad registers 710_1 and 710_2 and the PL registers 730_1 and 730_2 and an input of the controller 490. The scrambler 770_1 may perform a scrambling algorithm on the pad-PL information (e.g. assembled values of the PL registers 730_1 and 730_2 and the pad registers 710_1 and 710_2) by applying the value of the SC register 750_1 and output the scrambled pad-PL information to the controller 490. The controller 490 subsequently replies to the host 110 with the scrambled pad-PL information as the exp-PL information.

The expanding circuit 410_7 may be further equipped with a scrambler 770_2 connected to inputs of the SC register 750_2 and the PL registers 730_1 and 730_2 and an output of the DMA controller 430. The scrambler 770_2 may perform a scrambling algorithm for applying the value of the SC register 750_2 on the raw PL information and output the scr-PL information [0:1] and [2:3] to the PL registers 730_1 and 730_2, respectively. The controller 490 obtains the scr-PL information of the PL register 730_1 as the exp-PL information [0:1], the dummy value of the pad register 710_1 as the exp-PL information [2:3], the scr-PL information of the PL register 730_2 as the exp-PL information [4:5] and the dummy value of the pad register 710_2 as the exp-PL information [6:7] and output the assembly to the data link layer 320 for replying to the host 110.

Those artisans may modify the component configuration of the expanding circuits 410_6 or 410_7 to achieve a similar but different interleaved-padding, for example, employing four 1-byte pad registers and four 1-byte PL registers, rearranging the components of the expanding circuit 410_6 or 410_7, or others, and the invention should not be limited thereto.

Figure 10:
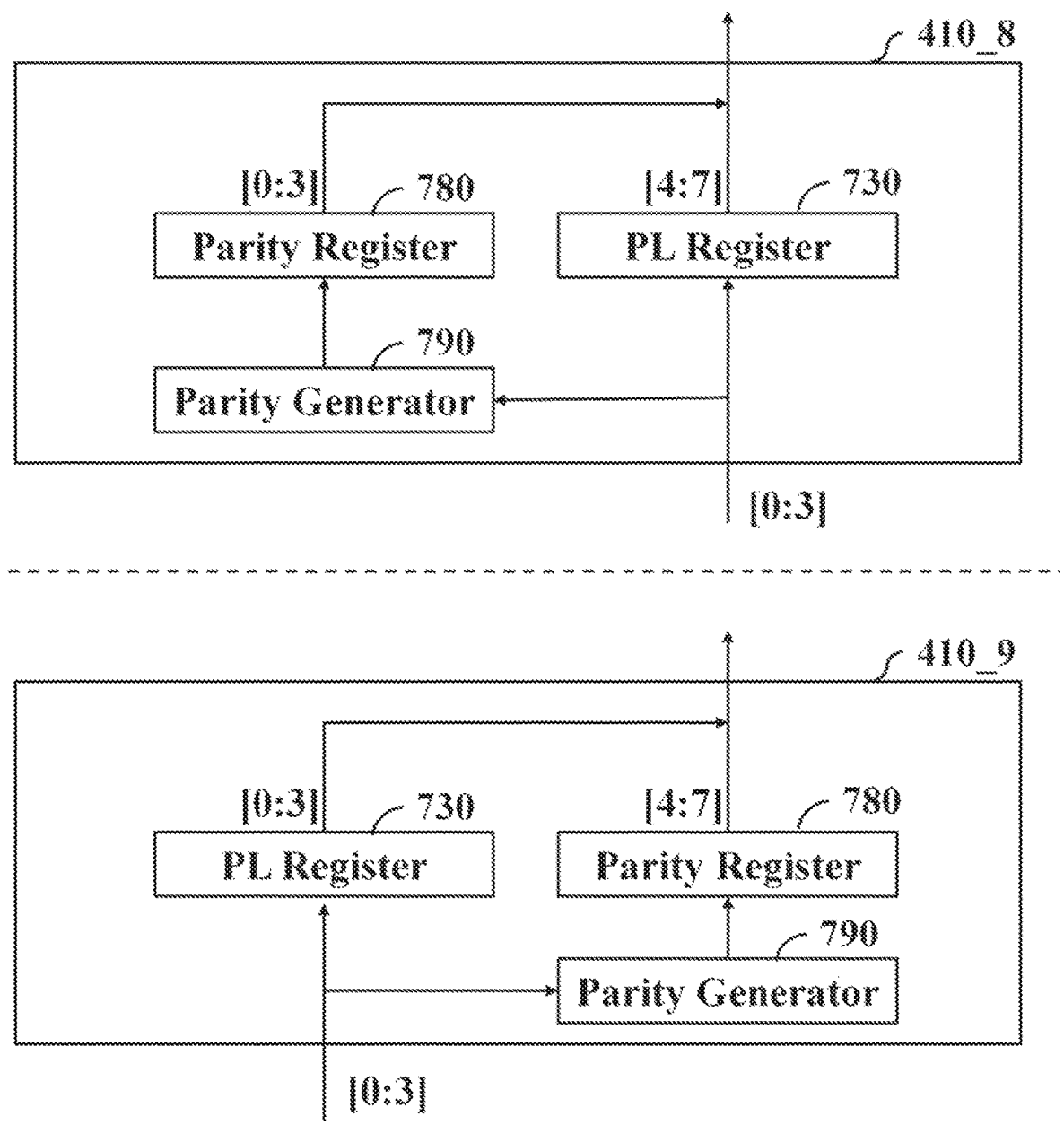

Refer to FIG. 4. The expanding circuit 410 may encode the PL information to generate the exp-PL information conform to a particular parity type. Specifically, the expanding circuit 410 may receive the PL information from the data buffer 450, accordingly append more bytes to that to make the exp-PL information with odd or even parity, and output the exp-PL information to the controller 490, thereby enabling the host 110 to determine whether received information is correct. When the received information is incorrect, the host may request the flash memory device 130 for retransmitting PL information for the corresponding logical location. As shown in FIG. 10, expanding circuits 410_8 and 410_9 are parity-type expanding circuits.

Refer to FIG. 10. The expanding circuit 410_8 may include a 4-byte parity register 780 and the 4-byte PL register 730. The expanding circuit 410_8 may further include a parity generator 790 connected to an output of the DMA controller 430 for generating extra bytes (so-called parity bytes) according to the raw PL information and storing the parity bytes in the parity register 780. For example, the parity generator 790 may include a comparator for determining an amount of bits being "1" of the raw PL information. If the amount is odd, then the parity generator 790 outputs parity bytes including an even number of bits being "1" (for example, 0x0000). If the amount is even, then the parity generator 790 outputs parity bytes including an odd number of bits being "1" (for example, 0x0001). The controller 490 obtains the parity bytes of the parity register 780 as the exp-PL information [0:3] and the PL information of the PL register 730 as the exp-PL information [4:7] and outputs the assembled ex-PL information with the odd parity to the data link layer 320. The above process may refer to as a pre-parity.

Similarly, the expanding circuit 410_9 may include the 4-byte PL register 730 and the 4-byte parity register 780. The controller 490 obtains the PL information of the PL register 730 as the exp-PL information [0:3] and the parity bytes of the parity register 780 as the exp-PL information [4:7] and outputs the assembled ex-PL information with the odd parity to the data link layer 320. The above process may refer to as a post-parity.

In alternative embodiments, those artisans may modify the parity generator 790 to output parity bytes including an odd number of bits being "1" (for example, 0x0001) when an amount of bits being "1" of the raw PL information is odd, and output parity bytes including an even number of bits being "1" (for example, 0x0000) when an amount of bits being "1" of the raw PL information is even, thereby enabling the expanding circuit 410_8 or 410_9 to output the exp-PL information [0:7] with the even parity.

In alternative embodiments, as to the length of the PL information being equal to that of the parity bytes, those artisans may remove the parity generator 790 from the expanding circuits 410_8 and 410_9. The parity register 780 is connected to the output of the DMA controller 430 and latches the raw PL information output from the DMA controller 430 as the parity bytes. The controller 490 obtains the PL information of the PL register 730 as the exp-PL information [0:3] and the PL information of the parity register 780 as the exp-PL information [4:7] and outputs the assembled exp-PL information with the even parity to the data link layer 320.

An expanding circuit 410_10 generates exp-PL information by appending interleaved-parity bytes to raw PL information. The expanding circuit 410_10 may include two 2-byte parity registers 780_1 and 780_2 and two 2-byte PL registers 730_1 and 730_2. The expanding circuit 410_10 may further include parity generators 790_1 and 790_2 connected to an output of the DMA controller 430. For example, the parity generator 790_1 may include a comparator for determining an amount of bits being "1" of the raw PL information. If the amount is odd, then the parity generator 790 outputs parity bytes including an even number of bits being "1" (for example, 0x00) to the parity register 780_1. If the amount is even, then the parity generator 790 outputs parity bytes including an odd number of bits being "1" (for example, 0x01) to the parity register 780_1. No matter whether the amount is odd or even, the parity generator 790_2 outputs parity bytes including an even number of bits being "1" (for example, 0x00) to the parity register 780_2. The controller 490 may read and treat the values of the PL register 730_1, the parity register 7801, the PL register 730_2 and the parity register 780_2 as exp-PL information [0:1], [2:3], [4:5] and [6:7], respectively, with the odd parity, and output the assembly to the data link layer 320. Those artisans may modify the component configuration of the expanding circuit 410_10 to achieve a similar but different interleaved-padding, for example, employing four 1-byte parity registers and four 1-byte PL registers, rearranging the components of the expanding circuit 410_10, or others, and the invention should not be limited thereto.

In alternative embodiments, those artisans may modify each of the parity generators 790_1 and 790_2 to output parity bytes including an odd number of bits being "1" (for example, 0x01) when an amount of bits being "1" of the raw PL information is odd, and output parity bytes including an even number of bits being "1" (for example, 0x00) when an amount of bits being "1" of the raw PL information is even, thereby enabling the expanding circuit 410_10 to output the exp-PL information [0:7] with the even parity.

In alternative embodiments, as to the length of the PL information being equal to that of the parity bytes, those artisans may remove the parity generators 790_1 and 790_2 from the expanding circuit 410_10. The parity registers 780_1 and 780_2 are connected to the output of the DMA controller 430 and latches physical block number and the unit number of the raw PL information, respectively, output from the DMA controller 430. The controller 490 obtains the content of the PL register 730_1, the parity register 780_1, the PL register 730_2 and the parity register 780_2 as the exp-PL information [0:1], [2:3], [4:5] and [6:7], respectively, and outputs the assembly with the even parity to the data link layer 320.

Figure 12:
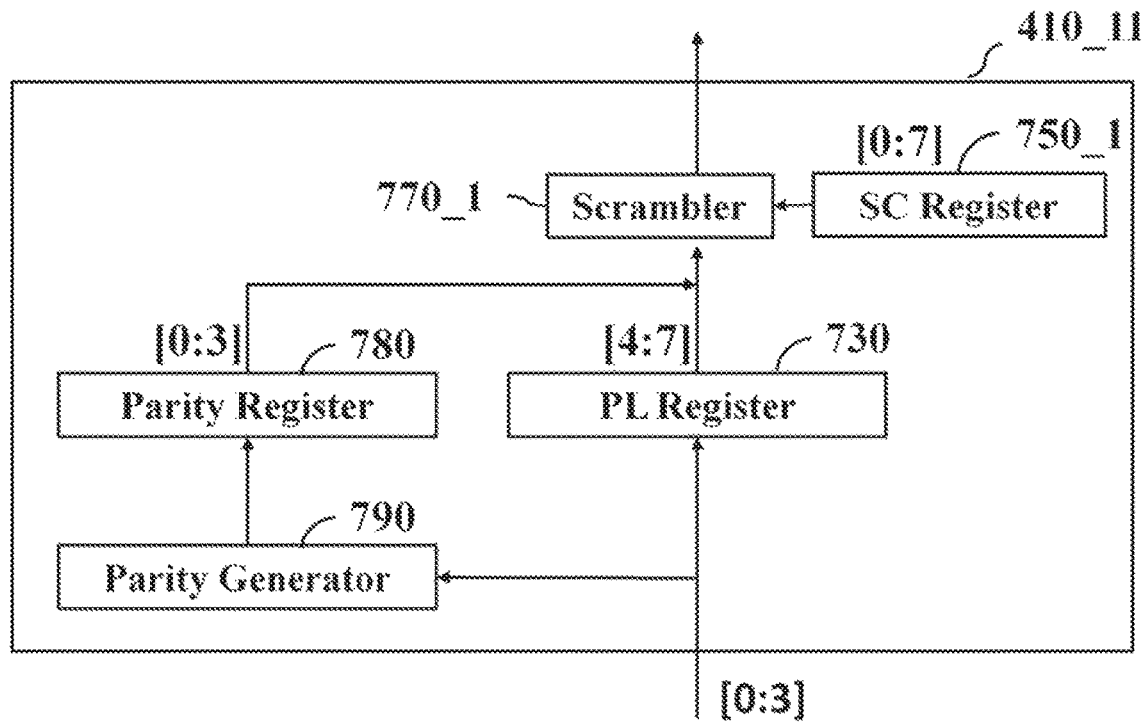
Figure 12:
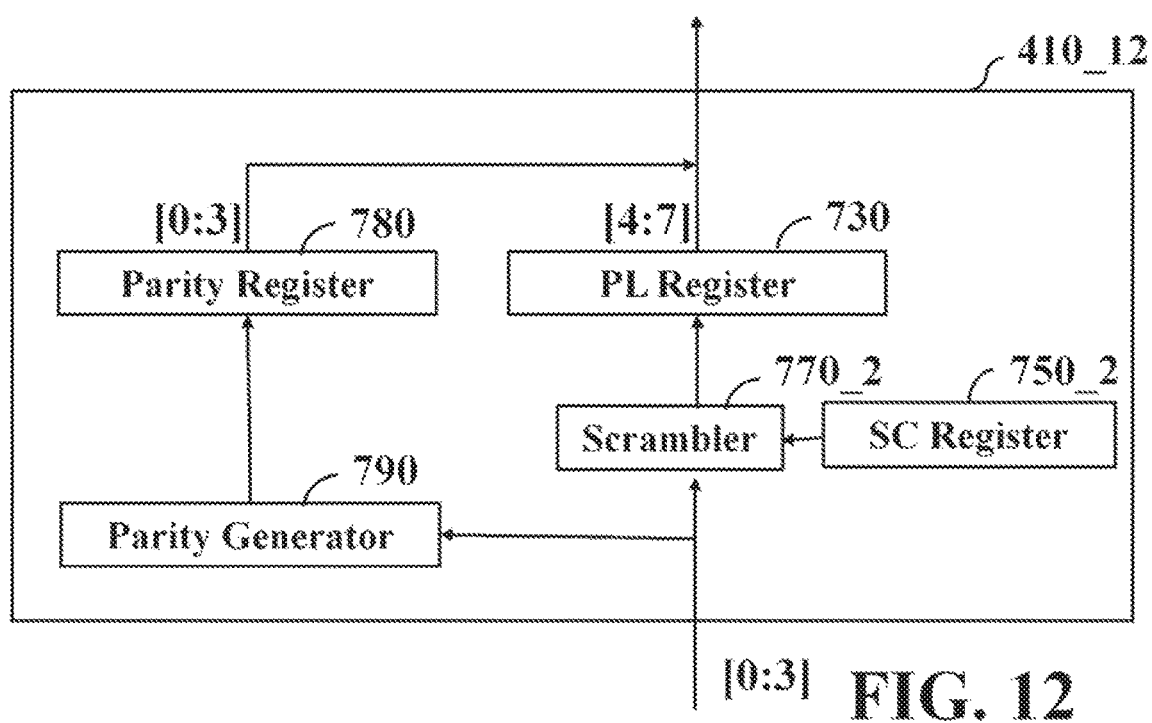

The parity-type expanding circuit 410_8 as shown in FIG. 10 may be improved by disposing a scrambler for scrambling the PL information to avoid a malicious use. FIG. 12 shows the improved expanding circuits 410_11 and 410_12. The expanding circuit 410_11 may include 8-byte SC register 750_1 for latching a SC [0:7]. The expanding circuit 410_11 may further dispose a scrambler 770_1 connected to outputs of the SC register 750_1, the parity register 780 and the PL register 730, and an input of the controller 490. The scrambler 770_1 may perform a scrambling algorithm for applying the value of the SC register 750_1 on the PL information with a parity type (par-PL information) and output the scrambled par-PL information to the controller 490.

The expanding circuit 410_12 may include 4-byte SC register 750_2 for latching a SC [0:3]. The expanding circuit 410_12 may further dispose a scrambler 770_2 connected to inputs of the SC register 750_2 and the PL register 730, and an output of the DMA controller 430. The scrambler 7702 may perform a scrambling algorithm for applying the value of the SC register 750_2 on the raw PL information and output the scrambled PL information to the PL register 730. The controller 490 obtains the parity bytes of the parity register 780 as exp-PL information [0:3] and the scrambled PL information of the PL register 730 as the exp-PL information [4:7] and outputs the assembly to the data link layer 320 for replying to the host 110.

The parity-type expanding circuit 410_9 as shown in FIG. 10 may be improved by disposing a scrambler for scrambling the par-PL information to avoid a malicious use. Those artisans may deduce the detailed modifications to the parity-type expanding circuit 410_9 with references made to the aforementioned modifications to the parity-type expanding circuit 410_8, being omitted for brevity.

Figure 11:
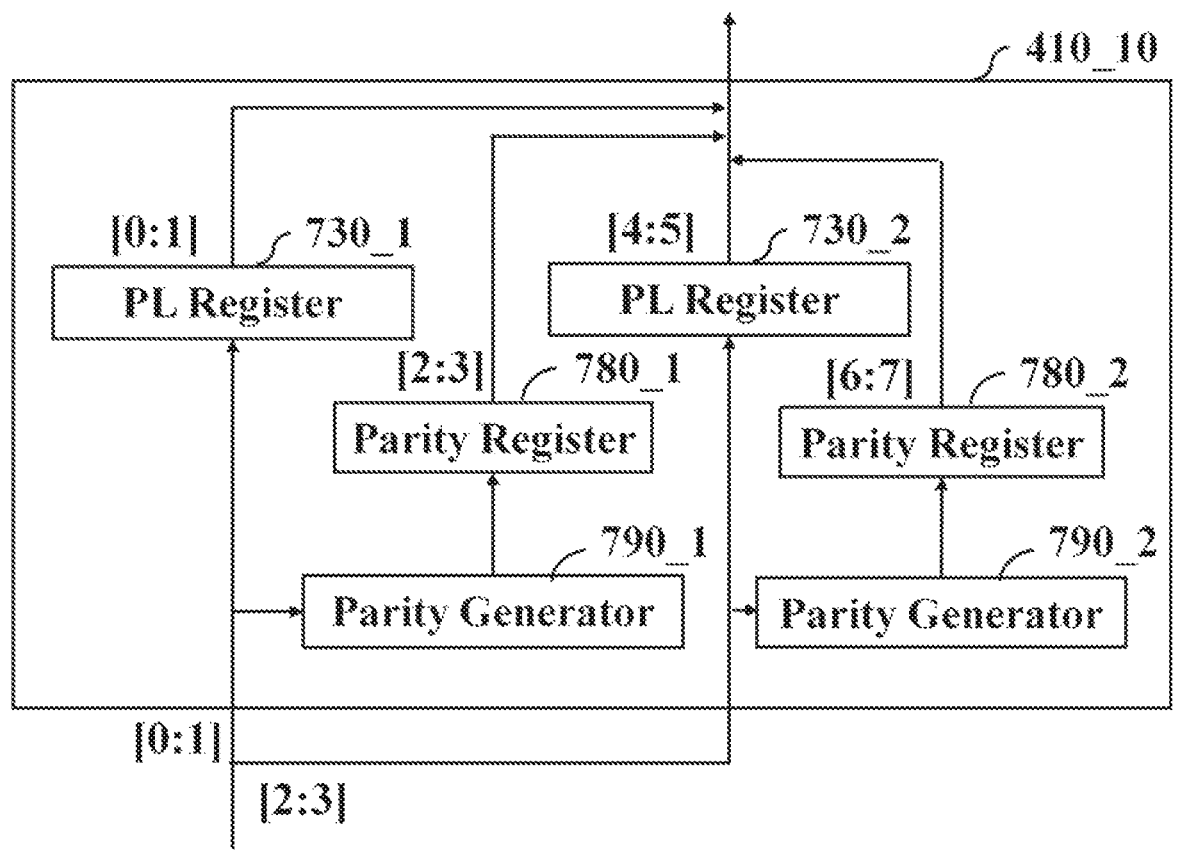
Figure 13:
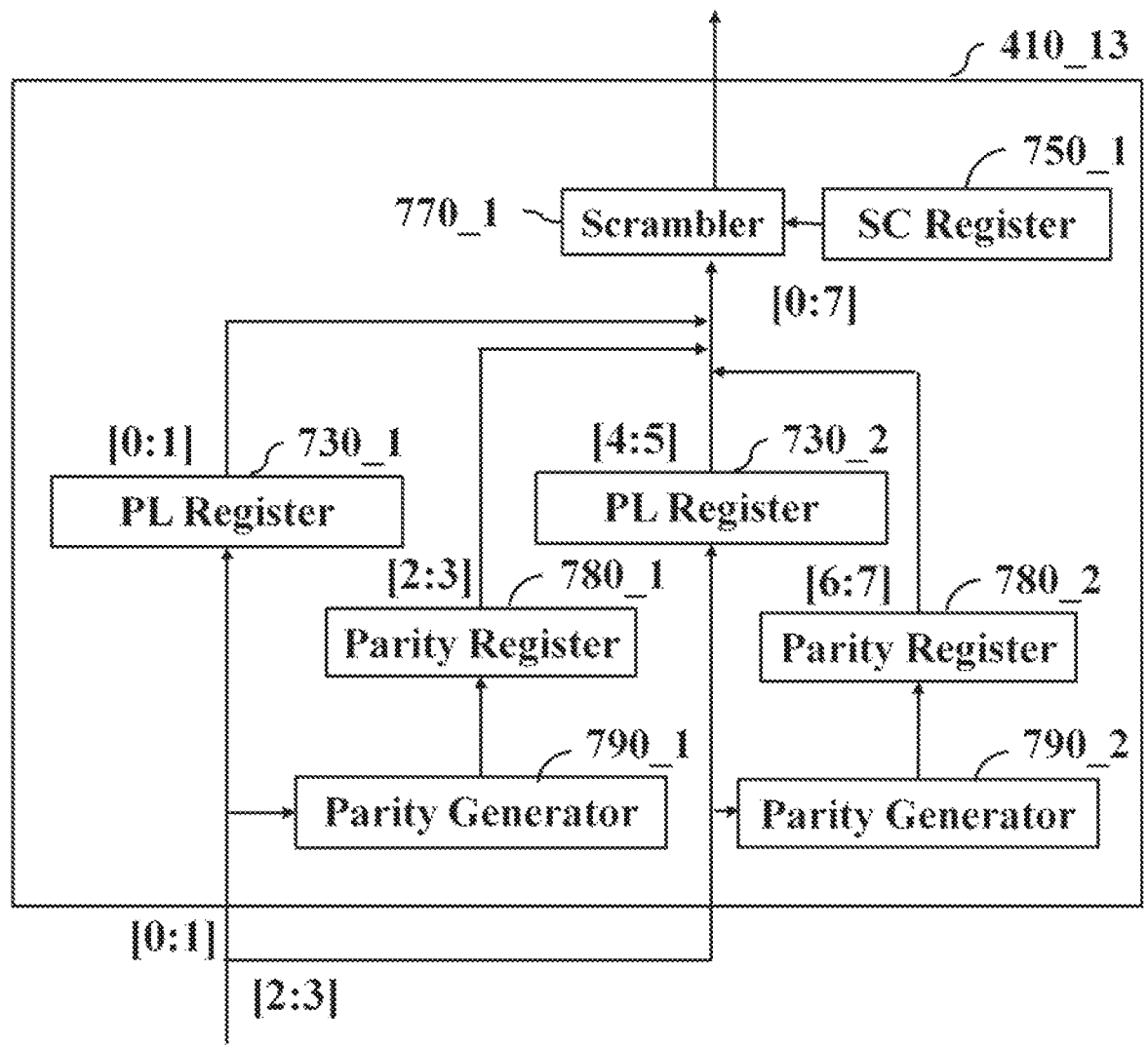

The parity-type expanding circuit 410_10 as shown in FIG. 11 may be improved by disposing a scrambler for scrambling the PL information to avoid a malicious use. FIG. 13 shows the improved expanding circuit 410_13. The expanding circuit 410_13 may further dispose a scrambler 770_1 electrically connected to outputs of the SC register 750_1, the parity registers 780_1 and 780_2 as well the PL registers 730_1 and 730_2, and an input of the controller 490. The scrambler 770_1 may perform a scrambling algorithm for applying the value of the SC register 750_1 on the par-PL information (assembled values of PL registers 730_1 and 730_2 and parity registers 780_1 and 780_2) and output the scrambled par-PL information to the controller 490. The controller 490 subsequently replies to the host 110 with the scrambled par-PL information.

In alternative embodiments, the parity-type expanding circuit 410_10 as shown in FIG. 11 may be improved by disposing the scrambler 770_2 between inputs of the PL registers 730_1 and 730_2 and an output of the DMA controller 430 for scrambling the PL information to avoid a malicious use. Those artisans may deduce the detailed modifications to the parity-type expanding circuit 410_10 with references made to the aforementioned modifications to the parity-type expanding circuit 410_7, being omitted for brevity.

Some or all of the aforementioned embodiments of the method of the invention may be implemented in a computer program such as an operating system for a computer, a driver for a dedicated hardware of a computer, or a software application program. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

The computer program may be advantageously stored on computation equipment, such as a computer, a notebook computer, a tablet PC, a mobile phone, a digital camera, a consumer electronic equipment, or others, such that the user of the computation equipment benefits from the aforementioned embodiments of methods implemented by the computer program when running on the computation equipment. Such the computation equipment may be connected to peripheral devices for registering user actions such as a computer mouse, a keyboard, a touch-sensitive screen or pad and so on.

Although the embodiment has been described as having specific elements in FIGS. 4, 7 to 13, it should be noted that additional elements may be included to achieve better performance without departing from the spirit of the invention. While the process flows described in FIG. 5 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for generating a storage mapping table of a flash memory device, comprising:
   a direct memory access (DMA) controller arranged operably read a first physical location (PL) address from a flash memory unit, wherein the first PL address corresponds to a logical location of the storage mapping table, wherein the first PL address is represented in a first number of bytes and the storage mapping table records information indicating which location in the flash memory unit that data of each logical location is physically stored in;
   an expanding circuit coupled to the DMA controller, arranged operably to obtain the first PL address read from the flash memory unit and expand the first PL address read from the flash memory unit into a second PL address being represented in a second number of bytes by appending data bits that originally provide different information from a physical address of the flash memory unit to the first PL address, wherein the second number of bytes is greater than the first number of bytes; and a controller coupled to the expanding circuit and arranged to operably transmit the second PL address to a host without transmitting the first PL address stored in the flash memory unit to the host.

2. The apparatus of claim 1, wherein the expanding circuit is arranged operably to generate the second PL address by appending padding data to the first PL address.

3. The apparatus of claim 2, wherein expanding circuit comprises:

a pad register arranged operably to latch a dummy value; and a PL register coupled to an output of the DMA controller and arranged operably to latch the first PL address, wherein the controller is arranged operably to obtain the dummy value and the first PL address and assemble the dummy value and the first PL address to form the second PL address.

4. The apparatus of claim 1, wherein the expanding circuit is arranged operably to generate third PL address by appending padding data to the first PL address and generate the second PL address by performing a scrambling algorithm for applying scrambling code on the third PL address.

5. The apparatus of claim 1, wherein the expanding circuit is arranged operably to generate third PL address by performing a scrambling algorithm for applying scrambling code on the first PL address and generate the second PL address by appending padding data to the third PL address.

6. The apparatus of claim 1, wherein the expanding circuit is arranged operably to generate a parity byte according to the first PL address and append the parity byte to the first PL address to form the second PL address with an odd parity or an even parity.

7. The apparatus of claim 6, wherein the expanding circuit comprises:

a parity generator coupled to an output of the DMA controller and arranged operably to generate the parity byte according to the first PL address;

a parity register coupled to the parity generator and arranged operably to latch the parity byte; and a PL register coupled to the output of the DMA controller and arranged operably to latch the first PL address, wherein the controller is arranged operably to obtain the parity byte and the first PL address and assemble the parity byte and the first PL address to form the second PL address with the odd parity or the even parity.

8. The apparatus of claim 7, wherein the parity generator is arranged operably to determine an amount of bits being "1" of the first PL address, output the parity byte including an even number of bits being "1" when the amount is odd and output the parity byte including an odd number of bits being "1" when the amount is even.

9. The apparatus of claim 7, wherein the parity generator is arranged operably to determine an amount of bits being "1" of the first PL address, output the parity byte including an odd number of bits being "1" when the amount is odd and output the parity byte including an even number of bits being "1" when the amount is even.

10. The apparatus of claim 6, wherein the expanding circuit comprises:

a parity register coupled to an output of the DMA controller and arranged operably to latch the first PL address as a parity byte; and a PL register coupled to the output of the DMA controller and arranged operably to latch the first PL address, wherein the controller is arranged operably to obtain the parity byte and the first PL address and assemble the parity byte and the first PL address to form the second PL address with an even parity.

11. The apparatus of claim 1, wherein the expanding circuit is arranged operably to generate a parity byte according to the first PL address, generate a third PL address by appending the parity byte to the first PL address and generate the second PL address by performing a scrambling algorithm for applying scrambling code on the third PL address.

12. The apparatus of claim 1, wherein the expanding circuit is arranged operably to generate a parity byte according to the first PL address, generate a third PL address by performing a scrambling algorithm for applying scrambling code on the first PL address and generate the second PL address by appending the parity byte to the third PL address.

13. The apparatus of claim 1, comprising: a processing unit coupled to the flash memory unit, arranged operably to maintain the content of the storage mapping table of the flash memory unit to indicate which location in the flash memory unit that data of each logical location is physically stored in.

14. A non-transitory computer program product for generating a storage mapping table of a flash memory device when executed by a processing unit, the non-transitory computer program product comprising program code to:

receive a read request comprising a logical location for the storage mapping table;

read a first physical location (PL) address from a flash memory unit, wherein the first PL address corresponds to the logical location, wherein the first PL address is represented in a first number of bytes;

store the first PL address in a data buffer; and output the first PL address to an expanding circuit, wherein the expanding circuit is coupled to a Direct Memory Access (DMA) controller and is arranged to operably obtain the first PL address read from the flash memory unit and expand the first PL address read from the flash memory unit into a second PL address being represented in a second number of bytes by appending data bits that originally provide different information from a physical address of the flash memory unit to the first PL address, thereby enabling a controller to reply to a host with the second PL address other than the first PL address stored in the flash memory unit, wherein the second number of bytes is greater than the first number of bytes, wherein the storage mapping table records information indicating which location in the flash memory unit that data of each logical location is physically stored in.

15. The non-transitory computer program product of claim 14, comprising program code to:

drive a flash memory controller to read the first PL address corresponding to the logical location from the flash memory unit and store the first PL address in the data buffer.

16. The non-transitory computer program product of claim 14, comprising program code to:

drive a direct memory access (DMA) controller to output the first PL address of the data buffer to the expanding circuit.

17. The non-transitory computer program product of claim 14, wherein the expanding circuit is arranged operably to generate the second PL address by appending padding data to the first PL address.

18. The non-transitory computer program product of claim 14, wherein the expanding circuit is arranged operably to generate a parity byte according to the first PL address and append the parity byte to the first PL address to generate the second PL address with an odd parity or an even parity.

19. A method for generating a storage mapping table of a flash memory device, performed by a processing unit, comprising:
  receiving a read request comprising a logical location for the storage mapping table;
  reading a first physical location (PL) address from a flash memory unit, wherein the first PL address corresponds to the logical location, wherein the first PL address is represented in a first number of bytes;
  storing the first PL address in a data buffer; and
  outputting the first PL address to an expanding circuit,
  wherein the expanding circuit is coupled to Direct Memory Access (DMA) controller and is arranged to operably obtain the first PL address read from the flash memory unit, expand the first PL address read from the flash memory unit into a second PL address being represented in a second number of bytes by appending data bits that originally provide different information from a physical address of the flash memory unit to the first PL address, and output the second PL address to a controller, thereby enabling the controller to reply to a host with the second PL address other than the first PL address stored in the flash memory unit,
  wherein the second number of bytes is greater than the first number of bytes,
  wherein the storage mapping table records information indicating which location in the flash memory unit that data of each logical location is physically stored in.

20. The method of claim 19, wherein the processing unit maintains the content of the storage mapping table to indicate which location in the flash memory unit that data of each logical location is physically stored in.

* * * * *